(12) United States Patent
Salg et al.

(10) Patent No.: US 7,527,575 B2
(45) Date of Patent: May 5, 2009

(54) LOCKABLE DIFFERENTIAL

(75) Inventors: Ditmar Salg, Röhrnbach (DE); Stefan Reicheneder, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 449 days.

(21) Appl. No.: 11/496,566

(22) Filed: Jul. 31, 2006

(65) Prior Publication Data
US 2007/0037655 A1 Feb. 15, 2007

(30) Foreign Application Priority Data
Aug. 10, 2005 (DE) .................... 10 2005 037 559

(51) Int. Cl.
*F16H 48/20* (2006.01)
(52) U.S. Cl. ...................... 475/231; 475/240
(58) Field of Classification Search ............... 475/231, 475/240, 241
See application file for complete search history.

(56) References Cited
U.S. PATENT DOCUMENTS
5,273,499 A 12/1993 Friedl et al.

| 5,342,255 | A  | * | 8/1994  | Slesinski et al. | 475/231 |
| 6,450,915 | B1 | * | 9/2002  | Kazaoka et al.   | 475/231 |
| 6,582,334 | B1 |   | 6/2003  | Noll             |         |
| 6,620,073 | B2 | * | 9/2003  | Kazaoka et al.   | 475/231 |
| 2002/0103053 | A1 | * | 8/2002  | Thompson      | 475/231 |
| 2004/0248692 | A1 | * | 12/2004 | Bryson et al. | 475/231 |
| 2006/0247087 | A1 | * | 11/2006 | Pontanari et al. | 475/231 |
| 2006/0276298 | A1 | * | 12/2006 | Rodgers et al. | 475/231 |
| 2007/0219041 | A1 | * | 9/2007  | Huber et al.  | 475/231 |

FOREIGN PATENT DOCUMENTS

| DE | 40 21 653 A1  |   | 1/1991  |
| DE | 199 50 171 A1 |   | 6/2001  |
| DE | 600 05 496 T2 |   | 7/2004  |
| EP | 0 496 469 A1  |   | 7/1992  |
| GB | 1 429 492     |   | 3/1976  |
| GB | 1 474 518     |   | 5/1977  |
| JP | 05338451      | * | 12/1993 |
| WO | WO-00/61972   |   | 10/2000 |

* cited by examiner

*Primary Examiner*—Sherry Estremsky
(74) *Attorney, Agent, or Firm*—Davis & Bujold, P.L.L.C.

(57) ABSTRACT

A lockable differential has one positive-fit clutch (12) actuatable in the opening and closing directions by displacement of a sliding sleeve (4), the sliding sleeve (4) being actuatable by a co-axially disposed piston (15).

10 Claims, 1 Drawing Sheet

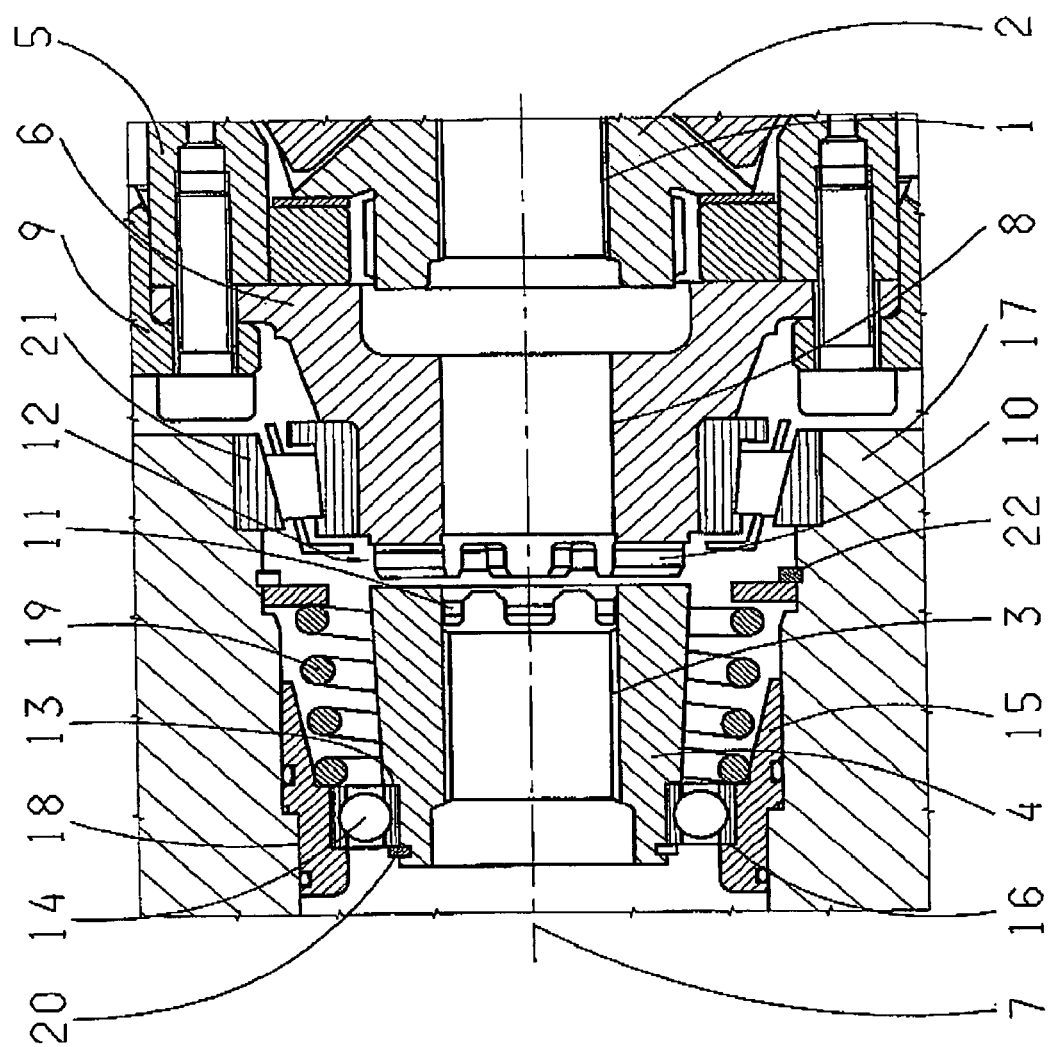

LOCKABLE DIFFERENTIAL

This application claims priority from German Application Serial No. 10 2005 037 559.6 filed Aug. 10, 2005.

FIELD OF THE INVENTION

The invention relates to a lockable differential.

BACKGROUND OF THE INVENTION

DE 199 50 171 B4 discloses a lockable differential in which a sliding sleeve is connected slip-free with a plug shaft and by displacement of the sliding sleeve a positive-fit clutch can be actuated in closing direction.

By closing the clutch, the plug shaft is non-rotatably connected with a crown gear. The sliding sleeve is moved via a shift fork situated upon a piston pin disposed at a distance. This kind of actuating device requires much installation space and is unsuitable for integration in a transmission.

The problem on which this invention is based is to provide a lockable differential whose actuating device is compact and of simple construction.

SUMMARY OF THE INVENTION

The lockable differential inventively has one actuating device whose piston is located co-axially relative to the sliding sleeve. The piston is located in a housing which forms the cylinder for the piston and preferably a bearing for the differential cage and in another development absorbs the section of a recoil spring for the piston. Between the piston and the sliding sleeve is situated a bearing which transmits the axial forces of the piston to the sliding sleeve.

In another development, the recoil spring for the piston acts directly upon the bearing whereby the baring is stationarily supported in the piston. The sliding sleeve has on its end facce a positive-fit gearing which engages in a positive-fit gearing of a part non-rotatably connected with the differential cage. The recoil spring and the piston are situated in the area of the sliding sleeve radially outside the sliding sleeve whereby a compact structural unit can be created by using a positive-fit clutch.

BRIEF DESCRIPTION OF THE DRAWINGS

The invention will now be described, by way of example, with reference to the accompanying drawing in which: features are to be understood from the description of the FIGURE.

FIG. 1 The single FIGURE shows a section of a lockable differential where the plug shaft has been removed.

DETAILED DESCRIPTION OF THE INVENTION

Accordingly, the plug shaft (not shown) has first engaging gears 1 which engage in the engaging gears of a bevel gear 2 thus non-rotatably connecting the plug shaft with the bevel gear. The plug shaft further has engaging gears which engage in engaging gears 3 of a sliding sleeve 4 thus non-rotatably connecting the sliding sleeve 4 with the plug shaft. A part 6 non-rotatably connected with a differential cage 5, extending along an axis of rotation 7, has a bore 8 within which is situated the plug shaft, the part 6 being capable of rotating around the plug shaft. The differential cage 5 is driven by a crown gear 9 (only partially shown). The part 6 has a spur gearing 10 on its side, remote from the differential cage, which can be operatively connected with a spur gearing 11 upon the sliding sleeve 4. The spur gearing 10 and the spur gearing 11 create a positive-fit clutch 12, actuatable in closing and opening directions by displacement of the sliding sleeve 4 along the axis of rotation 7. The sliding sleeve 4 has a contact surface 13 whereon abuts a bearing 14 and a piston 15 has a contact surface 16 whereon, likewise, abuts the bearing 14. A housing 17 forms a cylinder 18 where is located the piston 15. By pressurizing the piston 15, it moves along the axis of rotation 7 and transmits this force, via the bearing 14, to the sliding sleeve 13 so as to actuate a clutch 12 in closing direction. The piston 15 moves here against tension of a spring 19 which moves the piston in the pressureless state back to its initial position. By the spring 19 acting upon the bearing 14, the bearing 14 is fixed between the contact surface 16 and the spring 19. By virtue of a guard ring 20, the tension of the spring 19 is transmitted via the spring 15 to the sliding sleeve 4. The part 6 is, likewise, supported in the housing 17 via a bearing 21. The spring 19 supports itself in the housing 17 via a guard ring 22. By using the positive-fit clutch 12, the spring 19 and the piston 15 can be situated radially outside the sliding sleeve 4, but in the axial area of the sliding sleeve 4 thereby creating a lockable differential of simple, compact construction

REFERENCE NUMERALS 1 engaging
2 bevel gear
3 engaging gears
4 sliding sleeve
5 differential cage
6 part
7 axis of rotation
8 bore
9 crown gear
10 spur gearing
11 spur gearing
12 clutch
13 contact surface
14 bearing
15 piston
16 contact surface
17 housing
18 cylinder
19 spring
20 guard ring
21 bearing
22 guard ring

The invention claimed is:
1. A lockable differential in which
a driven differential cage (5),
a bevel gear (2), and
a sliding sleeve (4)
are all co-axially disposed along a common axis of rotation (7) and a plug shaft is non-torsionally connected with the bevel gear (2) and the sliding sleeve (4), a first lockable part (6) is non-rotatably connected with the differential cage (5) and forms a first part (10) of a positive-fit clutch (12), the sliding sleeve (4) forms a second lockable part (11) of the positive-fit clutch (12), the positive-fit clutch (12) being engaged and disengaged by displacement of the sliding sleeve (4) along the common axis of rotation (7), the sliding sleeve (4) being biased toward an engagement direction by pressurization of a piston (15) which is located co-axially relative to the sliding sleeve (4), and the piston (15) applying a displacement force to the sliding sleeve (4) via a bearing (14);

the piston (15) has a contact surface (16) and the sliding sleeve (4) has a contact surface (13), and the bearing (14) is located between the contact surface (16) of the piston (15) and the contact surface (13) of the sliding sleeve (4); and a spring (19) forces the bearing (14) to engage with the contact surface (16) of the piston (15).

2. The lockable differential according to claim 1, wherein the non-rotatably connected first lockable part (6) is supported within a housing (17) by a bearing (21), and the housing (17) forms a cylinder (18) for the piston (15).

3. The lockable differential according to claim 2, wherein the piston (15) is supported in the housing (17) and the spring (19) biases the piston (15) in a disengagement direction.

4. The lockable differential according to claim 1, wherein the piston (15), when pressurized, moves against tension applied by the spring (19).

5. The lockable differential according to claim 1, wherein the Positive-fit clutch (12) is engaged by pressurization of the piston (15) against spring tension applied by the spring (19) and disengaged by the spring tension applied by the spring (19).

6. A lockable differential in which
a driven differential cage (5),
a bevel gear (2), and
a sliding sleeve (4)
are all co-axially disposed along a common axis of rotation (7) and a plug shaft being non-torsionally connected with the bevel gear (2) and the sliding sleeve (4), a first lockable part (6) being non-rotatably connected with the differential cage (5) and forms a first part (10) of a positive-fit clutch (12), the sliding sleeve (4) forms a second lockable part (11) of the positive-fit clutch (12), the positive-fit clutch (12) being engaged and disengaged by displacement of the sliding sleeve (4) along the common axis of rotation (7), the sliding sleeve (4) being biased in an engagement direction by pressurization of a piston (15) which is located co-axially relative to the sliding sleeve (4), and the piston (15) applying a displacement force to the sliding sleeve (4) via a bearing (14); and a spring (19) biases the bearing (14) to engage with a contact surface (16) of the piston (15).

7. The lockable differential according to claim 6, wherein the non-rotatably connected first lockable part (6) is supported within a housing (17) by a bearing (21), and the housing (17) forms a cylinder (18) for the piston (15).

8. The lockable differential according to claim 7, wherein the piston (15) is supported in the housing (17) and the spring (19) biases the piston (15) in a disengagement direction.

9. The lockable differential according to claim 6, wherein the piston (15), when pressurized, moves against tension applied by the spring (19).

10. The lockable differential according to claim 6, wherein the positive-fit clutch (12) is engaged by pressurization of the piston (15) against spring tension applied by the spring (19) and disengaged by the spring tension applied by the spring (19).

* * * * *